Dec. 26, 1950 W. D. LEWIS 2,535,303
ELECTRONIC SWITCH
Filed Oct. 21, 1949 2 Sheets-Sheet 1

INVENTOR
W. D. LEWIS
BY H. A. Burgess
ATTORNEY

ELECTRONIC SWITCH

INVENTOR
W. D. LEWIS
BY
H. A. Burgess
ATTORNEY

Patented Dec. 26, 1950

2,535,303

UNITED STATES PATENT OFFICE 2,535,303

ELECTRONIC SWITCH

Willard D. Lewis, Little Silver, N. J., assignor to Bell Telephone Laboratories, Incorporated, New York, N. Y., a corporation of New York Application October 21, 1949, Serial No. 122,765

20 Claims. (Cl. 171—97)

This invention relates to electronic switches and more particularly to switches comprising asymmetrically conducting devices as their principal elements.

Switching plays an ever increasingly important role in present day communications. The need for improved electronic means capable of switching signals without undue attenuation or distortion has been emphasized by the advent of pulse communication systems wherein the intelligence bearing pulses are sometimes of extremely short duration. And, where it is desirable to multiplex a number of narrow band channels on a single broad band channel as, for example, in time division multiplex transmission, there is need for simple and inexpensive switching means so that operation over the shorter routes becomes economically feasible.

It is an object of this invention to provide an improved electronic switch.

It is a more specific object of this invention to provide relatively simple and inexpensive electronic means capable of switching a signal wave from one transmission medium to another.

It is a further object of the invention to provide means capable of switching signal pulses of extremely short duration.

It is a further object of this invention to provide an electronic switch which can be closed only through simultaneous application of a plurality of control voltages.

An electronic switch according to the present invention will be disclosed herein in the form of a T-network of asymmetrically conducting devices having like electrodes connected to the junction point. Such a switch displays high attenuation when a control voltage of one polarity is applied in series with the shunt device and low attenuation when the control voltage is of the opposite polarity. If the T-network is expanded to comprise a plurality of shunt arms, each containing a similarly connected asymetrical device, the low attenuation condition will be realized only when the control voltages applied to each arm are simultaneously of the same and correct polarity.

It should be understood that in the present specification and appended claims the term "asymmetrically conducting device" refers to any of the well-known devices which present a relatively low impedance to applied voltage of one polarity and a very high impedance to voltages of the opposite polarity so that they permit substantial conduction in but one direction therethrough. If the pulses to be passed by the switches are extremely short in duration, an asymmetrical device capable of passing such pulses would, of course, be necessary. Such devices are now well known in the art and include, for example, germanium crystal diodes.

The invention will be more clearly understood from a consideration of the following detailed description of illustrative embodiments when read in connection with the attached drawings in which.

Figures 1, 2:
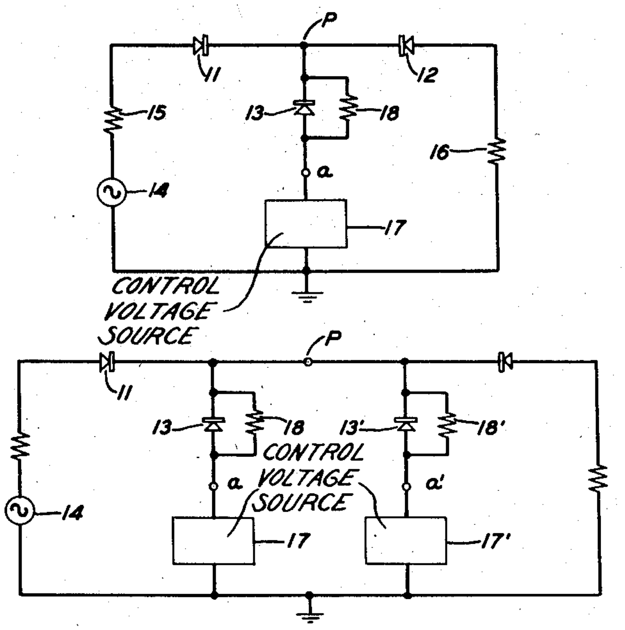
Fig. 1 shows in schematic form an electronic switch embodying principles of the present invention.
Fig. 2 shows in similar form a switch responsive to two control voltages.
Figure 3A:
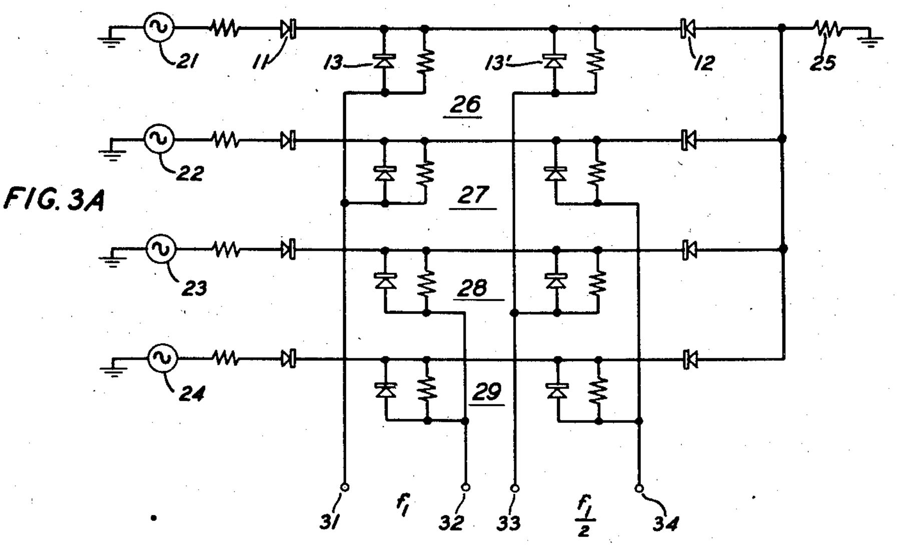
Figure 3B:
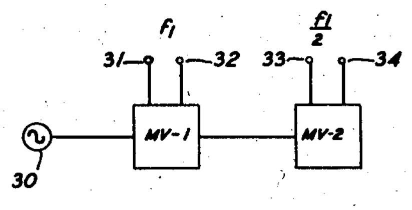
Figure 3C:
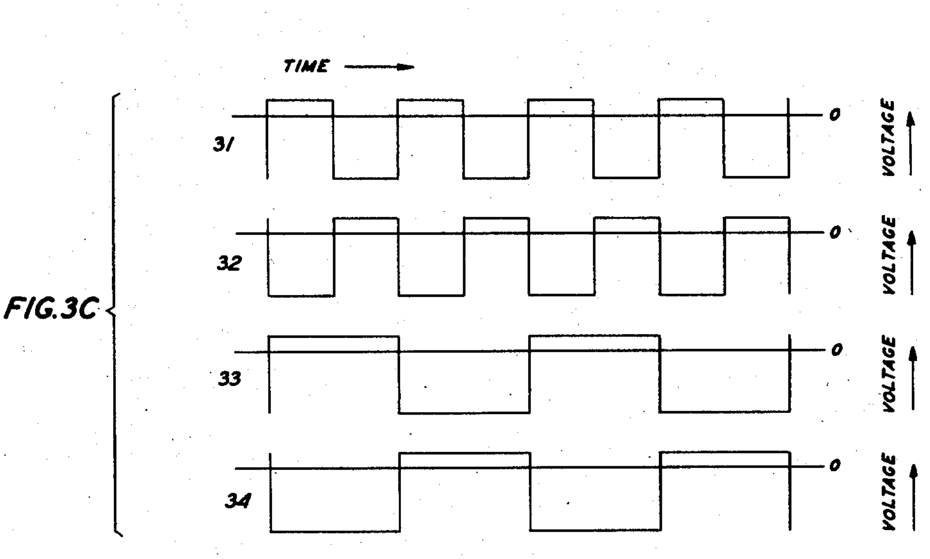
Figure 4:
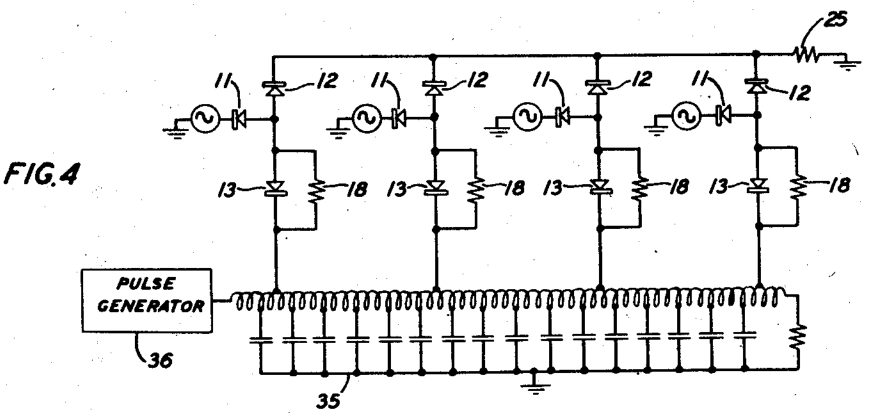

Fig. 3*a* shows, in schematic, a counter-actuated time multiplexing switch comprising switches of the type shown in Fig. 2;

Fig. 3*b* illustrates by block diagram a counter associable with the switch of Fig. 3*a*;

Fig. 3*c* shows diagrams descriptive of the time multiplexing switch of Fig. 3*a*; and Fig. 4 shows schematically a delay line actuated time multiplexing switch.

Referring now to Fig. 1, a simple switch according to the present invention comprises a T-configuration of three asymmetrically conducting devices 11, 12 and 13 having like electrodes connected to the junction point P. These devices are adapted to control the flow of power from a generator 14 having internal resistance 15 to a load 16. This control is effected by a voltage source 17 which applies biasing voltages of either polarity in series with the shunt or control device 13. This bias voltage is applied to the electrode of the shunt device 13 other than the one connected to the junction point P.

With the asymmetrical devices connected as shown in Fig. 1, if the control voltage is positive, i. e., the source 17 makes the point *a* positive with respect to ground, the switch will produce a large attenuation in power flowing from the generator 14 to the load 16. This will be evident by considering the effective resistances of the asymmetrical devices in the network when a voltage of this polarity is applied. Current flows through the control asymmetrical device 13 in parallel with a resistance 18 in the low resistance or passing direction, and through the series devices 11 and 12 in the high resistance or blocking direction, making the point P positive and biasing back the series devices 11 and 12 in their high resistance direction. In this condition the network of Fig. 1 is a T-pad with a low parallel resistance and consequently a pad which introduces high attenuation between the generator 14 and load 16.

With a negative control voltage in the network of Fig. 1 the device 13 is driven in its high resistance direction so that the shunt resistance of the T-pad is substantially equal to that of the resistance 18. Current flows through the series devices 11 and 12 in their low resistance direction so that the T-pad now has low series resistance and high parallel resistance and attenuation between the generator 14 and load 16 will be small. If the resistance 18 is made too small, the attenuation is increased because of the increased shunt load. If, however, the resistance 18 is made too large, the attenuation is increased because the drive on the series devices 11 and 12 will be too small, and their resistances will consequently be too large. Minimum attenuation will, therefore, be found for some optimum value of the resistance 18.

Fig. 2 is a schematic diagram of a switch having two controls. When the polarities of the sources 17 and 17′ are the same, the operation of the switch is evident from the preceding description of the operation of the switch of Fig. 1. If, however, the polarities of the sources 17 and 17′ should be such that the point $a'$ is positive and the point $a$ negative, the point P will be at plus potential since it is connected to the source 17′ through the low resistance of the asymmetrical device 13′ and to the source 17 through the high resistance of the device 13.

Since the point P is positive with respect to ground, current therefrom through the series branches places the devices 11 and 12 in the high resistance state and the network introduces a high attenuation in power flowing from the generator 14. The same is also true if the polarities of the sources 17 and 17′ are reversed so that point $a$ is positive and point $a'$ negative. It is obvious, therefore, that the only passing condition is realized when the polarities of the sources 17 and 17′ are the same and both negative.

The principles of the switch in Fig. 2 may be extended so as to produce a switch having $n$ controls merely by adding similarly connected shunt arms to a total of $n$, one for each of the $n$ controls, and it follows that the low attenuation or passing condition will be realized only when all control voltages are simultaneously negative.

It should be noted that the asymmetrical devices in Figs. 1 and 2 may be poled in the opposite manner to the ones shown therein. With the devices reversed, in polarity, the passing condition will be realized only when all control voltages are simultaneously positive. It is only necessary that like terminals of the asymmetrical devices be connected to the junction point P.

The principles of the present invention may be applied by way of example to time multiplexing as shown in Fig. 3$a$. Therein is shown a switch designed to sequentially select a channel or signal source 21—24 and apply each in turn to a common load 25. The load 25 may be a translating or coding device, transmission means, or any of the other means which will readily occur to one skilled in the art. Four switches 26—29, each with two control devices 13 and 13′ as described in connection with Fig. 2 are used to connect the individual channels to the common output. As previously discussed, a given switch will close only if both its control voltages are negative. By way of example, a two-stage electronic binary counter suitable for biasing the various control devices and therefore suitable for controlling the multiplexing switch of Fig. 3$a$ is illustrated in Fig. 3$b$. A pair of multivibrators MV1 and MV2 are driven by a stable frequency source 30. If the outputs of the multivibrators are rectangular pulses and if the frequency of MV1 is twice that of MV2, their respective outputs will appear as shown in Fig. 3$c$. These diagrams illustrate the output at each of the terminals 31 through 34 of the multivibrators and from a consideration thereof, it will be evident that the channels will be selected in order and individually connected to the common load 35. Thus, in the first time interval indicated, terminals 31 and 33 are positive while terminals 32 and 34 are negative. In this time interval, only the signal from source 24 is sampled and transmitted. In the next time interval, terminals 31 and 34 are negative, and the signal from source 22 is transmitted. In the third time interval, terminals 32 and 33 are negative, and the signal from source 23 is sampled, and so on.

This counter method of actuating a multiplexing switch array can obviously be extended to more channels. This may be done by increasing the number of stages in the primary counter in which case the number of channels must be some power of 2. Alternatively, the primary counter stages may be replaced by ring counter stages capable of counting higher than 2 per stage.

As another application of the principles of the present invention, Fig. 4 shows a delay line actuated time multiplexing switch. This switch comprises a plurality of units similar to those shown in Fig. 1 but with the asymmetrical devices poled in the opposite direction for illustration. The control devices 13 of each of these units is connected to a point on a delay line 35, which may be of any well-known type. A pulse generator 36 provides pulses at the sampling rate and of the proper polarity, which would be positive in the embodiment shown. To avoid overlap, the pulse width must be somewhat shorter than T/N where T is the sampling rate and N is the number of channels. The pulser 36 feeds the delay line 35, which has a total delay of T, and the control devices 13 of the switches are connected at N equally spaced points along the line so that each switch is opened at a time T/N later than the previous one. If the asymmetrical devices in Fig. 4 are poled in the opposite manner, the pulse generator 36 would be adapted to feed negative pulses to the delay line 35.

It is emphasized that the operation of any of the embodiments described will be similar if all the asymmetrical devices in that embodiment are poled in a manner opposite to that shown and if the polarities of the control voltages are also reversed. And, although the invention has been described as relating to specific embodiments, numerous other arrangements will occur to those skilled in the art without departing from the spirit and scope of the invention.

What is claimed is:

1. An electronic switch having an input and an output which comprises a T-network of asymmetrically conducting devices having like electrodes connected to the junction point thereof, means connecting said input to one of the series arms of said network, means connecting said output to the other series arm, control means for said switch, means connecting said control means to the shunt arm of said network, and a resistance in parallel with the shunt arm asymmetric device of said network.

2. An electronic switch having an input and an output which comprises a network of asymmetrically conducting devices connected in T-configuration, means connecting said input to one arm of said network, means connecting said output to another of said arms, control means for said switch connected to the remaining arm of said network, and a resistance in parallel with the device in said remaining arm.

3. A multicontrol switch having an input and an output which comprises in combination an input arm containing a first asymmetric device in series with said input, an output arm containing a second asymmetric device in series with said output, and control means connected between said input and said output arms comprising a plurality of asymmetric devices connected in parallel and control means in series with each of said plurality of devices, said input, said output, and said control means connected respectively to like electrodes of their associated asymmetric devices.

4. The combination according to claim 3 wherein said control means each comprise a source of voltage.

5. The combination according to claim 3 and a resistance in parallel with each of said plurality of devices.

6. An electronic switch having an input circuit and an output circuit and comprising a pair of asymmetrically conducting devices connected in series between said input and said output, a third asymmetrical device having one electrode connected to said first two devices at the junction thereof, said three asymmetrical devices having like electrodes connected to the junction point, means to apply a voltage in series with said third asymmetrical device, and a resistance in parallel with said third asymmetric device.

7. An electronic switch having an input and an output which comprises in combination a first asymmetric device in series with said input, a second asymmetric device in series with said output, means connected between said first and second devices to control the transfer of energy from said input to said output comprising a plurality of asymmetric devices connected in parallel, and biasing means for each of said plurality of devices.

8. The combination in accordance with claim 7 and a resistance in parallel with each of the said plurality of devices.

9. The combination according to claim 7 wherein said input, said output, and said means are connected respectively to like electrodes of said devices.

10. A star-connected network of asymmetrically conducting devices having like electrodes connected to the junction point thereof, an energy source in series with one of said devices, a load circuit in series with another of said devices, said last two-named devices being interposed between said junction point and said source and said load circuit respectively, and means connected to the electrode of each of the remaining of said asymmetric devices other than the said like electrode to apply a direct voltage in series with its associated asymmetric device.

11. The combination according to claim 10 and a resistance in parallel with each of said remaining asymmetric devices.

12. A T-network of asymmetrically conducting devices having like terminals connected to the junction point thereof, a resistance in parallel with the shunt device of said network, a voltage source in series with the parallel combination of said shunt device and said resistance, an input circuit in series with one of the series asymmetric devices, and an output circuit in series with the other series device.

13. The combination according to claim 12, said parallel combination being interposed between said voltage source and said junction point.

14. Means under control of a plurality of control means to allow an exchange of energy between an input circuit and an output circuit comprising a first and a second two-terminal asymmetrically conducting device connected in series with and between said input and said output, said devices being connected together by like terminals, a plurality of similar asymmetric devices, one for each of said control means, each having the one terminal thereof corresponding to said like terminal connected to a point between said first and second devices, means for each of said plurality of asymmetric devices for applying a bias voltage in series with each of said plurality of devices, and to the terminal thereof other than the one corresponding to said like terminal, and said last-named means individually and uniquely under control of one of said control means.

15. The combination according to claim 14 and a resistance in parallel with each of said plurality of asymmetric devices.

16. Switching means to control the flow of energy between an energy source and a load comprising in combination a pair of asymmetrically conducting devices connected in series between said source and said load, a plurality of similar asymmetrical devices each having one electrode connected to a point between the devices of said pair, the said pair and said plurality of asymmetrical devices having one set of like electrodes connected together, a resistance in parallel with each of said plurality of asymmetric devices, and control means, one for each of said plurality of devices, comprising a voltage source connected to the electrode of each of said plurality of devices other than the said like electrode.

17. A circuit for controllably impressing signals from a plurality of input circuits upon a common output circuit which comprises a pair of asymmetrically conducting devices for each of said inputs, each of said pairs connected in series between one of said input circuits and said output circuit, a control asymmetrically conducting device connected to the junction point of each of said pairs, each of said pairs and its associated control device having like electrodes connected to their junction point, and means to apply biasing voltages to each of said control devices.

18. A circuit for impressing signals from a plurality of input circuits upon a common output circuit in a time division multiplex manner which comprises a plurality of sets of asymmetrically conducting devices, one set for each of said input circuits, the devices of each of said sets being connected together by like electrodes, means connecting each of said input circuits in series with a first device of each of said sets, means connecting a second of said devices of each of said sets by its electrode other than said like electrode to said output circuit, and means for sequentially, by sets, applying biasing voltages of like polarity to the remaining devices of each of said sets.

19. The combination in accordance with claim 18, and means to apply a biasing voltage of a polarity opposite to that of said like polarity to at least one of said remaining devices in each of said sets at all times when said biasing voltages of like polarity are not being applied to the said remaining devices of that set.

20. A circuit for selectively associating one of a group of $m$ circuits, where $m$ is an integer with a given circuit which comprises $m$ sets of asymmetrically conducting devices, the devices of each of said sets being connected together by like electrodes, means connecting each of said $m$ circuits in series with a first device of one of said sets, means connecting said given circuit to a second device of each of said sets, and means for selectively establishing a desired association which comprises means to apply biasing potentials to the remaining devices of each of said sets.

WILLARD D. LEWIS.

REFERENCES CITED

The following references are of record in the file of this patent:

UNITED STATES PATENTS

| Number | Name | Date |
| --- | --- | --- |
| 2,258,732 | Blumlein | Oct. 11, 1941 |